(12) United States Patent
Kim et al.

(10) Patent No.: US 6,959,142 B2
(45) Date of Patent: *Oct. 25, 2005

(54) METHOD OF CREATING AND RECORDING PRESENTATION ORDER INFORMATION MANAGEMENT INFORMATION FOR A REWRITABLE RECORDING MEDIUM

(75) Inventors: Byung-Jin Kim, Kyunggido (KR); Kang-Soo Seo, Kyunggido (KR); Ki-Won Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/753,413

(22) Filed: Jan. 9, 2004

(65) Prior Publication Data

US 2004/0141725 A1 Jul. 22, 2004

Related U.S. Application Data

(63) Continuation of application No. 10/133,317, filed on Apr. 29, 2002, now Pat. No. 6,735,376, which is a continuation of application No. 10/921,610, filed on Dec. 23, 1998, now Pat. No. 6,421,499.

(30) Foreign Application Priority Data

Sep. 5, 1998 (KR) ............................................ 98-36862

(51) Int. Cl.[7] ................................................ H04N 5/91
(52) U.S. Cl. ........................................ 386/95; 386/126
(58) Field of Search ............................. 386/46, 95, 98, 386/112, 120, 125, 126

(56) References Cited

U.S. PATENT DOCUMENTS

| | | | |
|---|---|---|---|
| 5,546,365 A | 8/1996 | Roth | |
| 5,854,873 A | 12/1998 | Mori et al. | |
| 5,999,698 A | 12/1999 | Nakai et al. | |
| 6,167,189 A | 12/2000 | Taira et al. | |
| 6,181,870 B1 | 1/2001 | Okada et al. | |
| 6,208,802 B1 | 3/2001 | Mori et al. | |
| 6,421,499 B1 * | 7/2002 | Kim et al. | 386/95 |
| 6,735,376 B2 * | 5/2004 | Kim et al. | 386/95 |

* cited by examiner

Primary Examiner—Huy Nguyen
(74) Attorney, Agent, or Firm—Birch, Stewart, Kolasch & Birch, LLP

(57) ABSTRACT

This invention provides a method of creating and recording presentation order management information for a rewritable recording medium, which enables effective control of the amount of the presentation order management information needed when a user edits preferred play lists of recorded data. In the present invention, each time a new play list is made by a user, a user-defined program chain is created, wherein presentation order information units for defining presentation order of user-chosen data are contained. The maximum number of user-defined program chains and the total number of presentation order information units are limited. When editing of a new play list is requested, the number of user-defined program chains created so far and the total number of presentation order information units contained in all the user-defined program chains are checked. The method allows editing of data depending upon the check result, thereby enabling effective control of the size for presentation order management data in the limited maximum size for navigation data.

17 Claims, 6 Drawing Sheets

Conventional Art

Conventional Art

Conventional Art

METHOD OF CREATING AND RECORDING PRESENTATION ORDER INFORMATION MANAGEMENT INFORMATION FOR A REWRITABLE RECORDING MEDIUM

This application is a Continuation of application Ser. No. 10/133,317, filed on Apr. 29, 2002, now U.S. Pat. No. 6,735,376 published May 11, 2004, which itself is a continuation of U.S application Ser. No. 09/219,610, filed Dec. 23, 1998, now U.S. Pat. No. 6,421,499, published Jul. 16, 2002 the entire contents of which are hereby incorporated by reference and for which priority is claimed under 35 U.S.C. §120; and this application claims priority of Application No. 98-36862 filed in Korea on Sep. 5, 1998 under 35 U.S.C. §119.

BACKGROUND OF THE INVENTION

1. Field of the Invention

The present invention relates generally to a method of creating and recording data management information for a rewritable recording medium, and more particularly, but not by way of limitation, to creation and recording of video object presentation order management data accompanied by editing presentation order of still or moving pictures recorded on the recording medium.

2. Description of the Related Art

Optical disks have come into wide use since the advent of compact disc (CD) and the demand for optical disks is expected to grow steadily with popularization of digital versatile disk (DVD). Optical disks include read-only disks such as CD-ROM and DVD-ROM, write-once disks such as CD-R and DVD-R, and rewritable disks such as CD-RW and DVD-RAM. The specification of DVD-RTRW, which is standard writing/reading format of a rewritable disk, has not released yet and standardization for the DVD-RTRW is under way.

As rewritable optical disks like DVD-RAM are of immensely large capacity, users may store a variety of data such as moving pictures, still pictures, audio data, and the like on a single recording medium. Each time a new data file is recorded on a rewritable recording medium, navigation information for locating the data file after recording is created and recorded along with the data file on the recording medium. The recorded navigation information is referred to whenever the relevant data file is accessed.

Navigation information regarding all data files stored on a recording medium is contained in a navigation data table as shown in FIG. 1, which is recorded as a single navigation data file on the recording medium. Accessing the recording medium entails loading the navigation data file into a memory, wherein the navigation data reside all the time. When recording a moving or still picture on the recording medium, the area in which the picture file will be recorded is determined with reference to the navigation information. Recording a picture file always accompanies creating management information regarding the recorded picture file and updating the navigation data file to include the newly created management information.

Management data pertaining to moving pictures comprise movie video object information (M_VOBI) and movie video object presentation order information (movie Cell Information or simply CI). Suppose that a moving picture file is composed of n movie video objects (M_VOBs) M_VOB#1~M_VOB#n as shown in FIG. 3. Since each M_VOB needs a M_VOBI and a CI, n M_VOBIs and n CIs are created in the same order that n M_VOBs are recorded. In FIG. 3, M_VOBI#1~M_VOBI#n correspond to M_VOB#1~M_VOB#n and C#2, C#4, . . . (shaded Cells in the box labeled ORG_PGC) correspond to M_VOB#1~M_VOB#n. The created M_VOBIs and CIs are stored in the movie A/V file information table (M_AVFIT) and the original program chain information table (ORG_PGCIT) of the navigation data shown in FIG. 1, respectively. As illustrated in FIG. 2a, Cell Information related to a movie VOB consists of several fields: Cell type (C_TY) indicating that the relevant VOB is moving picture data, the ID number of the relevant M_VOB (M_VOB_ID), the presentation start time (C_V_S_PTM) and presentation end time (C_V_E_PTM) of the relevant M_VOB, the index number of the text data connected with the CI (IT_TXT_N), and the index number of the thumbnail connected with the CI (THMNL_N).

When the recording medium is accessed, the navigation data file is read from the recording medium and loaded into a memory as mentioned before. If reproduction of a moving picture is requested, M_VOBIs and CIs relevant to the requested moving picture file are read from the M_AVFIT and ORG_PGCIT of the navigation data table, respectively. In reference to the M_VOBIs and CIs, the requested moving picture file can be located from the recording medium and reproduced.

On the other hand, management data pertaining to still pictures comprise still picture video object information (S_VOBI) and still picture video object presentation order information (still picture Cell Information or simply CI). Suppose that a still picture file is composed of n still picture video objects (S_VOBs) S_VOB#1~S_VOB#n as shown in FIG. 3. Since each S_VOB needs a S_VOBI and a CI, n S_VOBIs and n CIs are created in the same order that n S_VOBs are recorded. In FIG. 3, S_VOBI#1~S_VOBI#n correspond to S_VOB#1~S_VOB#n and C#1, C#3, . . . (not shaded Cells in the box labeled ORG_PGC) correspond to S_VOB#1~S_VOB#n. The created S_VOBIs and CIs are stored in the still picture A/V file information table (S_AVFIT) and the original program chain information table (ORG_PGCIT) of the navigation data shown in FIG. 1, respectively. As illustrated in FIG. 2b, Cell Information related to a still picture VOB consists of several fields: Cell type (C_TY) indicating that the relevant VOB is still picture data, the ID number of the relevant S_VOB (S_VOB_ID), the playback time (C_PB_TM), presentation start time (C_V_S_PTM), and still time (C_STILL_TM) of the relevant S_VOB, the index number of the text data connected with the CI (IT_TXT_N), and the index number of the thumbnail connected with the CI (THMNL_N).

The procedure for reproducing a still picture is similar to that for reproducing a moving picture. If reproduction of a still picture is requested, S_VOBIs and CIs relevant to the requested still picture file are read from the S_AVFIT and ORG_PGCIT of the navigation data table, respectively. In reference to the S_VOBIs and CIs, the requested still picture file can be located from the recording medium and reproduced.

The navigation data file is used in the same manner when movie or still picture files recorded on the recording medium are edited. If a user makes or edits a list of moving or still pictures to reproduce them in a preferred order, management data regarding the list are created with reference to the navigation data loaded into the memory. The management data consist of a series of CIs corresponding to the selected pictures, which forms a user-defined PGC (UD_PGC) to be stored in the user-defined PGC information (UD_PGCI) of the user-defined PGC information table (UD_PGCIT) shown in FIG. 1. UD_PGC#i is stored in UD_PGCI#i.

If reproduction of a play list of picture files is requested, the UD_PGC stored in the UD_PGCI corresponding to the requested play list is read from the UD_PGCIT of the navigation data in the memory. Then, the M_VOBIs and S_VOBIs corresponding to the CIs can be read from the M_AVFIT and S_AVFIT. Finally, the VOBs linked to the play list can be read out and the play list can be reproduced in reference to the VOBIs and CIs.

In the above method, the amount of the navigation data increases with the number of user-defined PGCs each of which contains information on a presentation order of VOBs, because each user-defined PGC is recorded in a user-defined PGCI in the navigation data table. It is an apparent drawback of the method, therefore, that the navigation data file may take excessive storage space as user-defined PGCs increase in number.

One possible solution to the above problem is to limit the maximum number of user-defined PGCs and the maximum number of CIs that a user-defined PGC can hold. This method, however, may give rise to other problems. Suppose that the number of CIs which a user-defined PGC can take is limited to N. In this case, some picture program to be reproduced continuously cannot be managed by a single user-defined PGC if the number of CIs contained in the picture program exceeds the prescribed bound N.

SUMMARY OF THE INVENTION

It is therefore a primary object of the present invention to provide a method of creating and recording presentation order management data for a rewritable recording medium, which enables effective control of the amount of presentation order management information needed for managing user-defined play lists in the limited maximum size of navigation data.

The method of creating and recording presentation order management information for a rewritable recording medium according to the present invention comprises steps of: creating information tables classified by the types of presentation order management of recorded data; checking the amount of presentation order management information contained in said information tables on the request of new presentation sequence; and controlling creation and record of new presentation order management information based on the result of said checking.

The information table utilized in the present invention comprises an original program chain information table and a user-defined program chain information table. The former table contains management information for reproducing recorded data in the recording order of the data, while the latter table contains management information for reproducing data in a user-preferred order. More specifically, the user-defined program chain information table contains presentation order information units for storing user-defined data presentation sequence and user-defined program chains each of which consists of a plurality of the presentation order information units. The method according to the present invention enables effective management of the amount of presentation order management data by controlling the maximum number of presentation order information units and the maximum number of user-defined program chains.

BRIEF DESCRIPTION OF THE DRAWINGS

The accompanying drawings, which are included to provide a further understanding of the invention, illustrate the preferred embodiment of this invention, and together with the description, serve to explain the principles of the present invention.

In the Drawings.

DETAILED DESCRIPTION OF THE PREFFERRED EMBODIMENT

The preferred embodiment of the present invention will be described in detail referring to the accompanying drawings.

Figure 4:
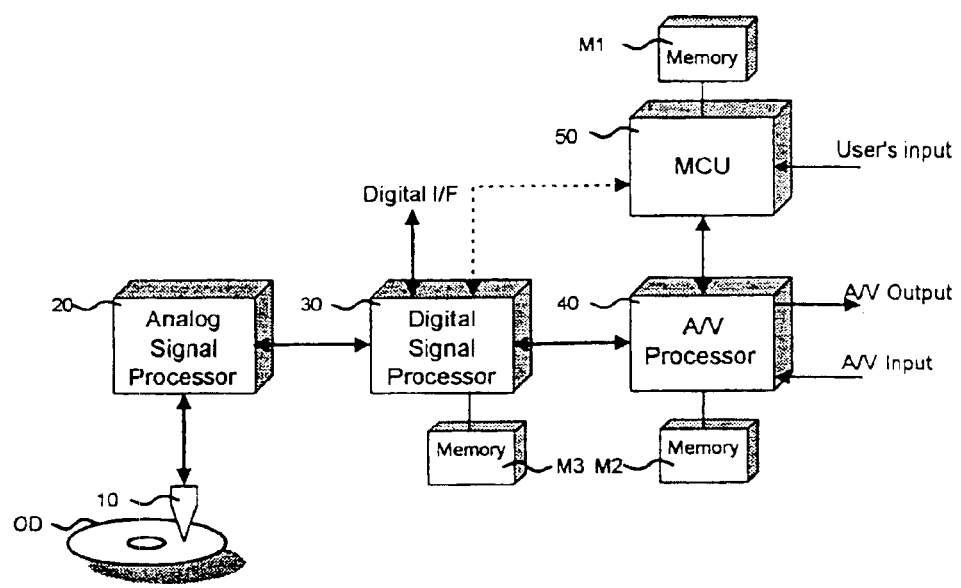
FIG. 4 is a schematic diagram of an optical disk recording/reproducing apparatus embodying the present invention.

FIG. 4 shows a schematic diagram of an optical disk recording/reproducing apparatus embodying the present invention.

The apparatus comprises an optical pickup 10 for recording/reproducing information on/from a recording medium OD, an analog signal processing unit 20 for filtering and digitizing high-frequency analog signals reproduced from the recording medium OD and converting digital data to be recorded on the recording medium OD into analog signals, a digital signal processing unit 30 for decoding and encoding digital data and yielding a control signal for data synchronism, an A/V data processing unit 40 for decoding audio/video input data, hereinafter referred to simply as A/V data, and encoding audio/video input signals into A/V data, a control unit 50 for controlling general operation of the apparatus in response to a user's requests, and a plurality of memories M1, M2, and M3 for storing temporary data created in each signal processing phase. The navigation data file is loaded into the memory M1.

Figure 1:
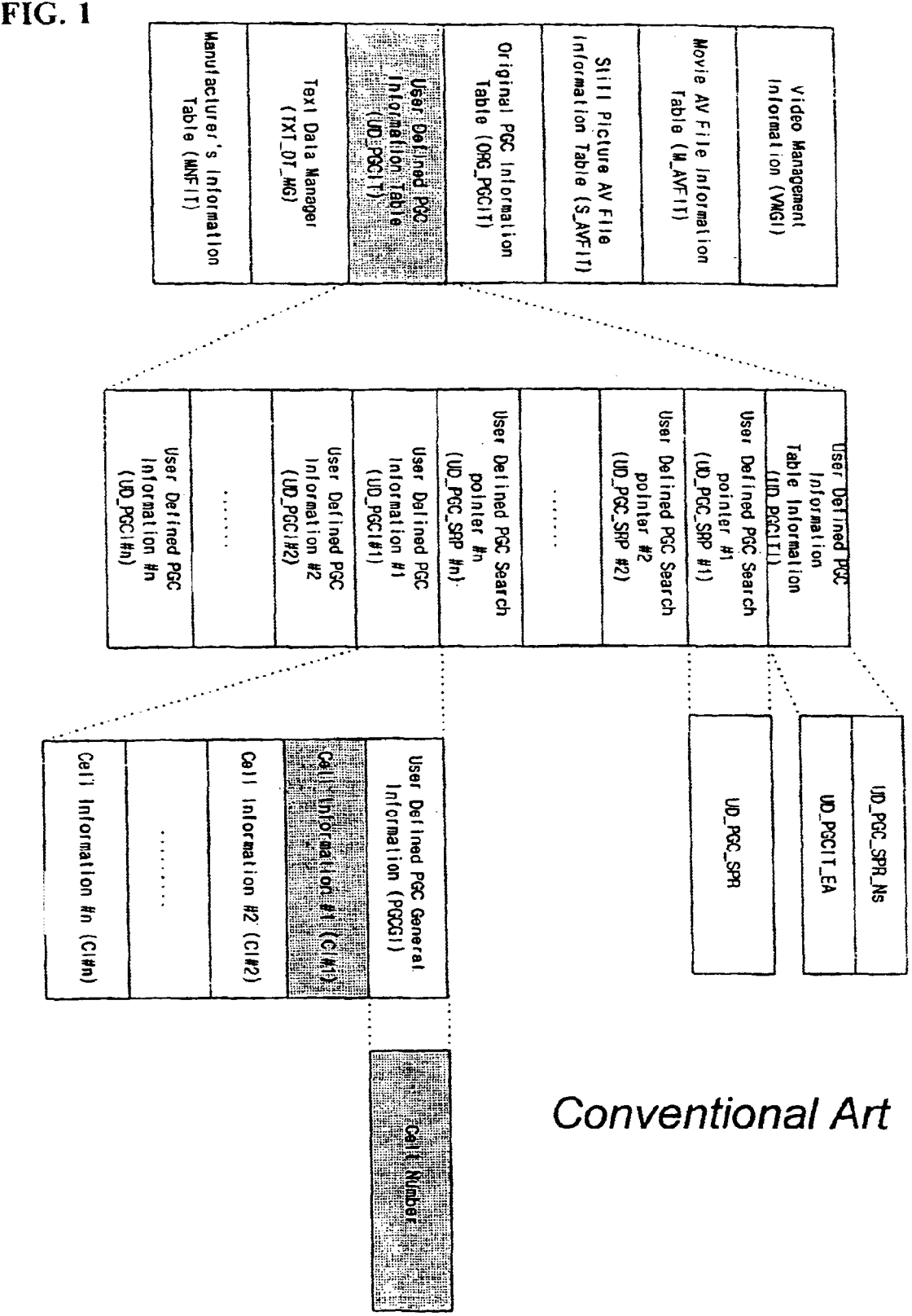
FIG. 1 is a table showing the navigation data file for managing data recorded on a rewritable recording medium.
Figure 2A:
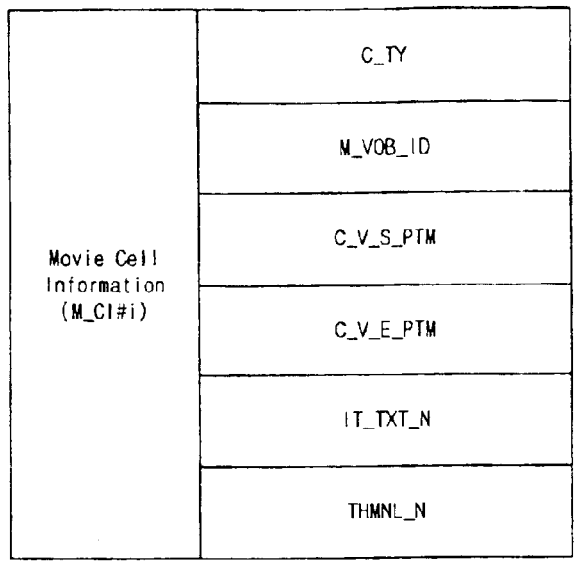
FIGS. 2a and 2b are tables showing the configuration of Cell Information.
Figure 2B:
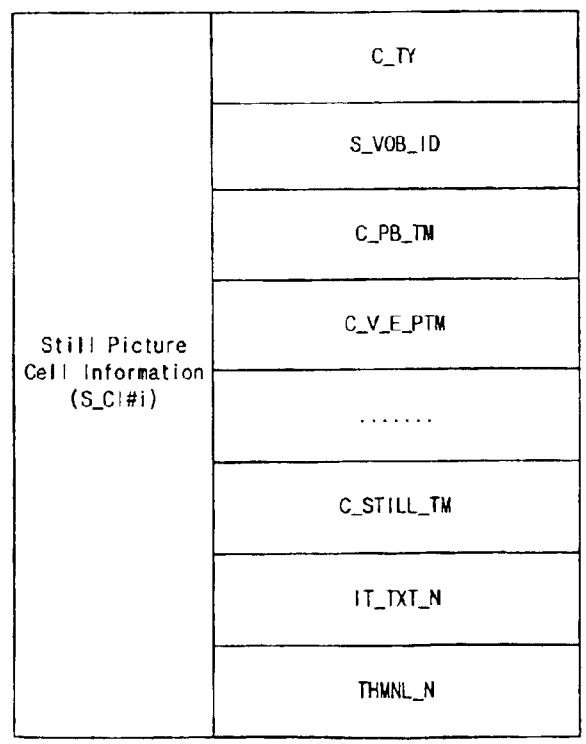

When recording a moving or still picture on the recording medium OD in the apparatus shown in FIG. 4, first of all the control unit 50 loads the navigation data file recorded on the recording medium OD into the memory M1. Referring to the loaded navigation data, the control unit 50 records the picture data on the recording medium OD and creates management information composed of M_VOBIs or S_VOBIs and CIs corresponding to VOBs forming the picture file. The series of CIs is recorded sequentially in the ORG_PGCIT of the navigation data table shown in FIG. 1, wherein the CIs are arranged in the recording order of the relevant VOBs. For this reason, the ORG_PTCIT is also a sequential presentation information table.

A user can make and edit lists of moving or still pictures selected from among pictures recorded on the recording medium OD to reproduce them in a preferred order. If editing mode is asked, the control unit 50 reads the number of user-defined program chain search pointers (UD_PGC_SRP_Ns) stored in the user-defined program chain information table information (UD_PGCITI) of the UD_PGCIT in the navigation data table. The value of UD_PGC_SRP_Ns indicates the number of UD_PGCIs currently contained in the navigation data file. In the UD_PGCIT, CIs related to the lists made by a user are stored, arranged in the prescribed reproduction order of relevant VOBs. For this reason, the UD_PGCIT is also a prescribed-order presentation information table.

Referring to the number of UD_PGCIs, the control unit 50 searches each UD_PGCI for the user-defined PGC general information (UD_PGCGI), which includes the Cell Number field indicating the number of CIs contained in the corresponding UD_PGCI. Also, the control unit 50 adds up the Cell Number of every UP_PGCGI to obtain the total number of CIs contained in the UD_PGCIT. Provided the number of UD_PGCIs is less than a preset limit (for example, 99). and the calculated total number of CIs is less than another preset limit (for example 25,000), the control unit 50 allows editing of recorded data.

Figure 3:
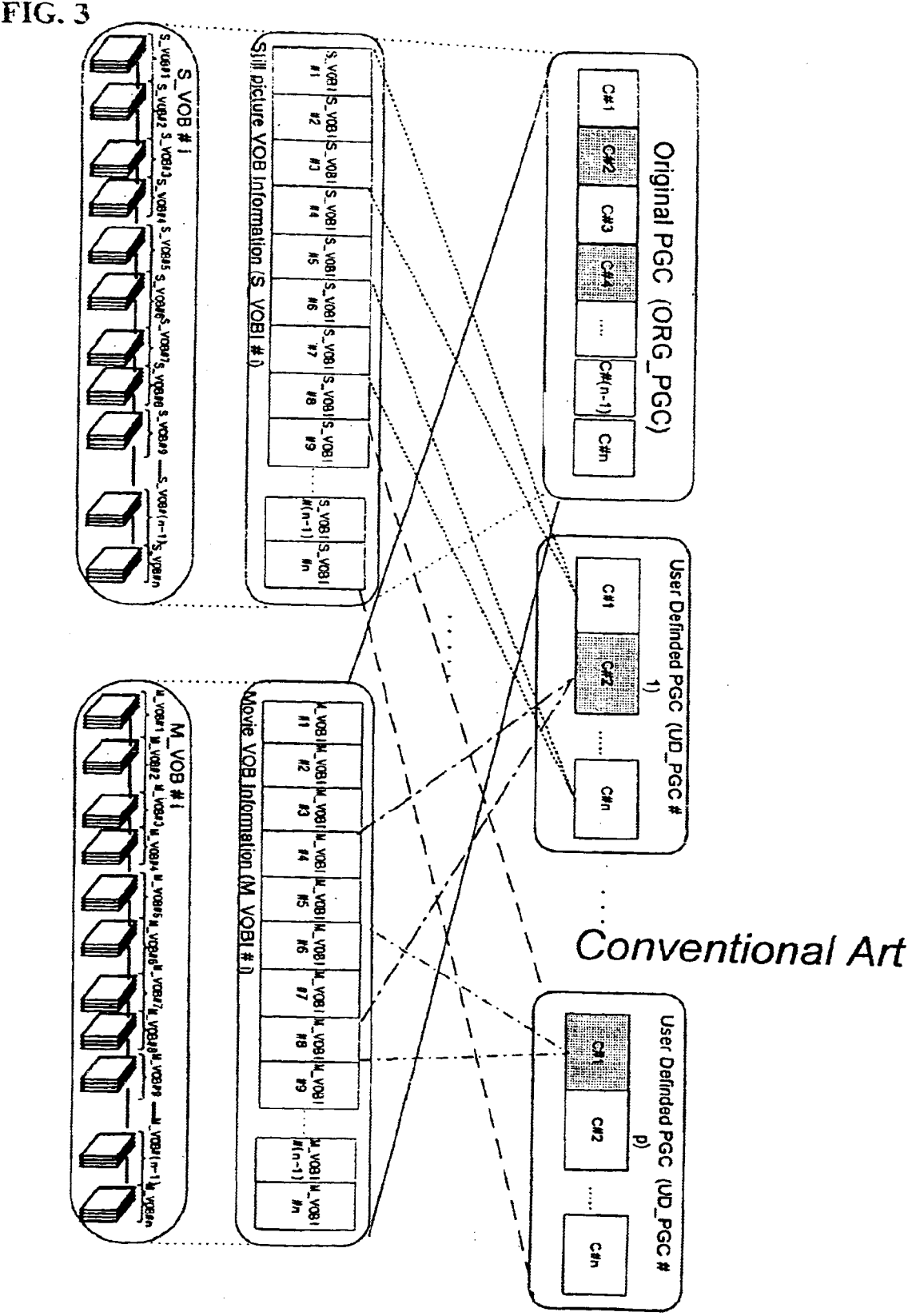
FIG. 3 is a schematic diagram illustrating the process of creating VOBIs and CIs generated with data recording and the process of creating CIs generated with editing of presentation orders of selected data.

The operation of editing mode is explained with reference to FIG. 3. If a user chooses S_VOBs, for example, S_VOB#1~S_VOB#3, the control unit 50 creates a CI, C#1, wherein the presentation order information of the chosen S_VOBs is stored. And then, if the user chooses M_VOBs, M_VOB#4~M_VOB#7, the control unit 50 creates another CI, C#2 to include the presentation order information of the chosen M_VOBs. To be more precise, the unit of user's choice is not a VOB but a single picture or audio file formed by a plurality of VOBs. The control unit 50 repeats the same procedure as long as the total number of CIs does not exceeds the preset limit value. When the editing mode ends, the control unit 50 completes creation of the UD_PGC wherein the newly created CIs are contained.

The present invention limits both the maximum number of user-defined PGCs (for example, 99) and the total number of CIs contained in the UD_PGCIT (for example, 25,000), while the maximum number of CIs that a user-defined PGC can hold is not limited. Therefore, provided the number of CIs contained in a list of pictures remains within the preset limit value (for example, 25000), it is possible to manage the list by a single user-defined PGC.

Figure 5A:
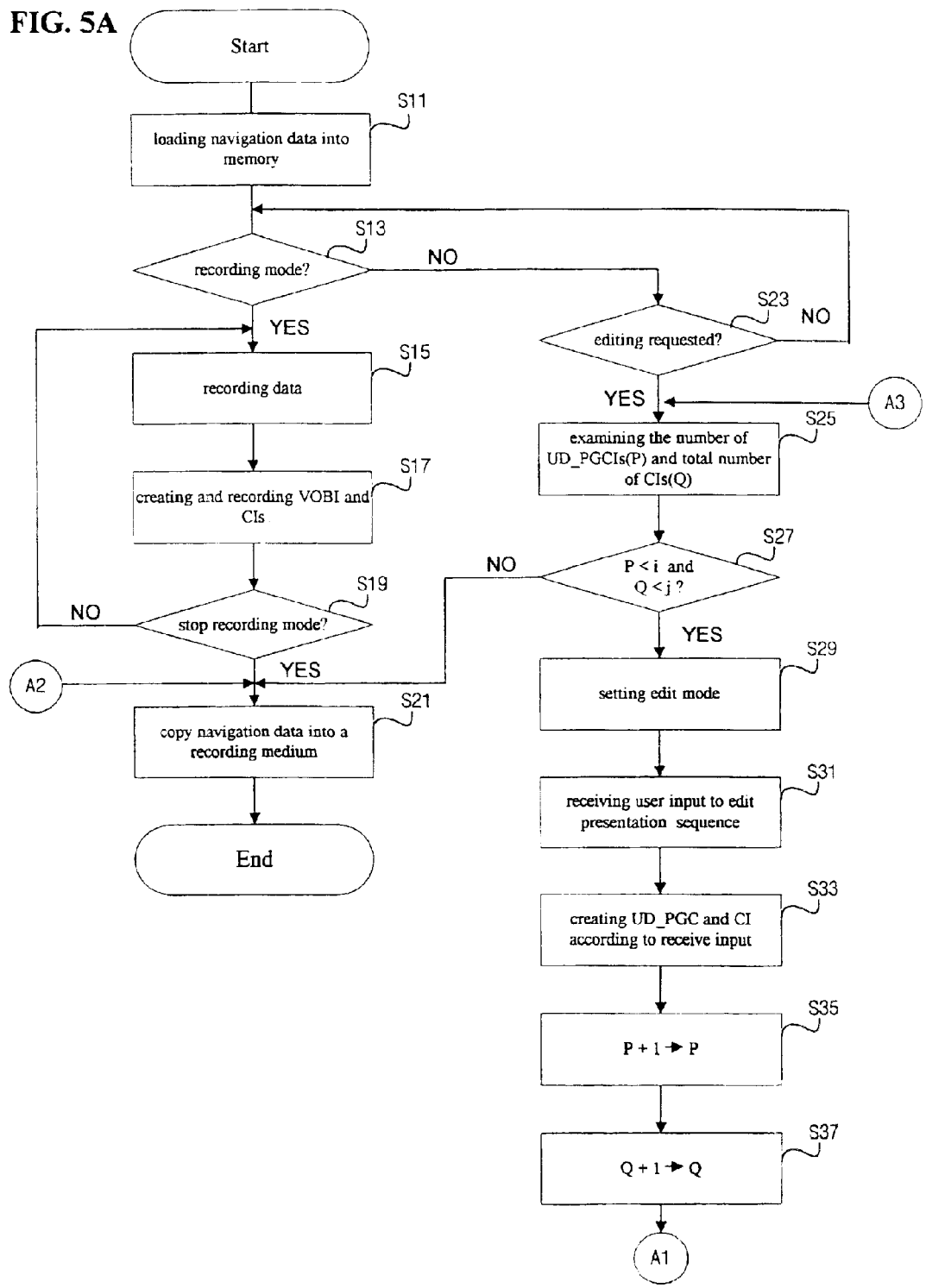
FIGS. 5a and 5b are flow charts depicting the method of creating and recording presentation order management data for a rewritable recording medium of the present invention.
Figure 5B:
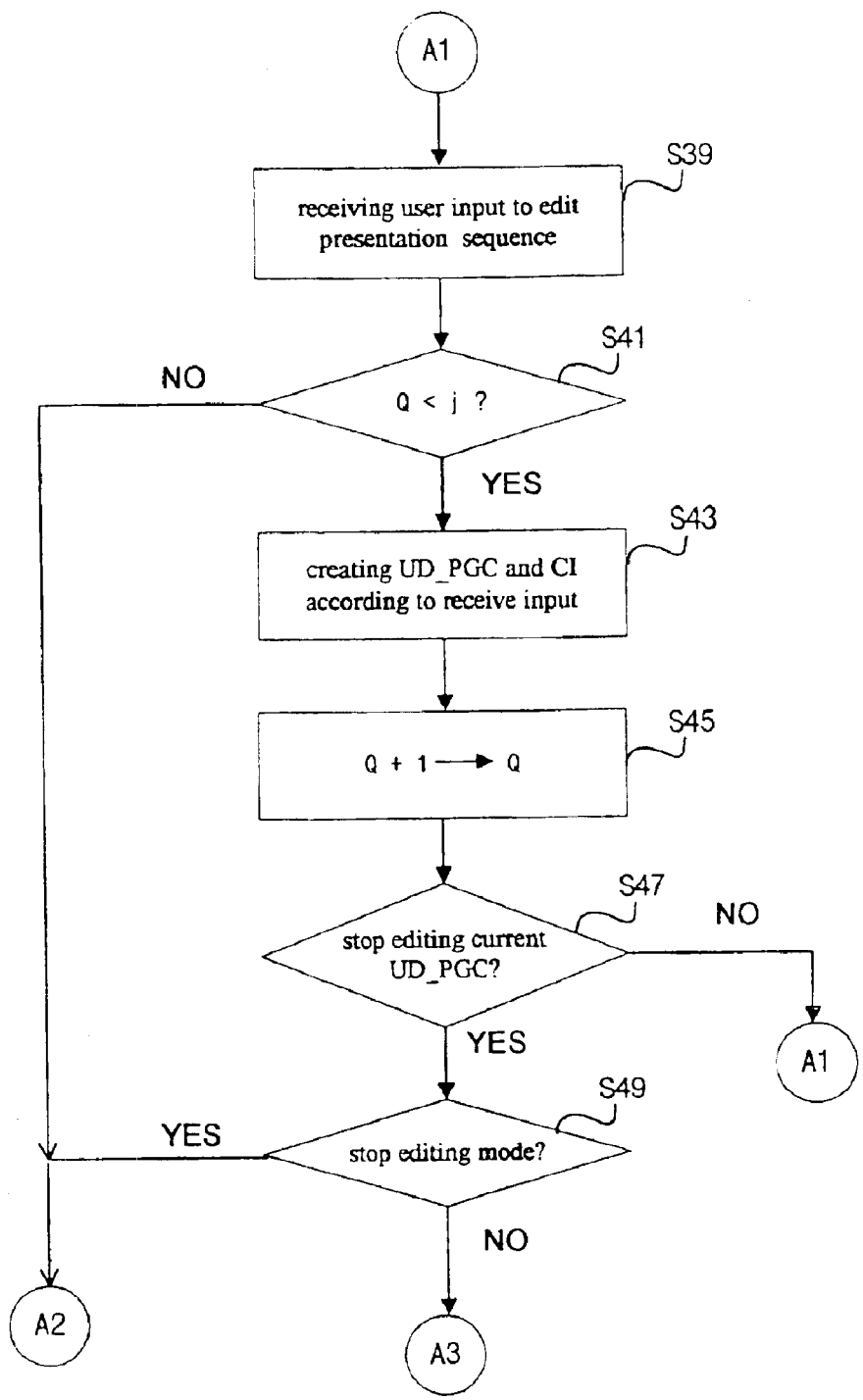

The method of creating and recording presentation order management data for rewritable recording medium according to the present invention is explained below in detail with reference to the flow chart shown in FIG. 5.

If a recording medium is loaded into the information recording/reproducing apparatus, the control unit 50 reads the navigation data file from the recording medium and stores the file in the memory M1 (S11).

If recording of a moving or still picture has been requested, the control unit 50 begins execution of a recording control routine (S13) and controls the A/V data processing unit 40, the digital signal processing unit 30, and the analog signal processing unit 20, so that the moving picture or still picture data obtained from an external device is recorded on the recording medium OD (S15). Subsequently, the control unit 50 groups the input picture data into VOBs (M_VOBs or S_VOBs), creates VOBIs regarding the grouped VOBs, and adds the VOBIs to the M_AVFIT or S_AVFIT of the navigation data stored in the memory M1. Also, the control unit 50 creates CIs regarding the recorded VOBs and adds the CIs to the ORG_PGCIT of the navigation data stored in the memory M1 (S17).

Completing the update of the navigation information table, the control unit 50 checks whether to end the recording mode (S19). If not, the above recording process S15 through S17 is repeated. If so, the control unit 50 reads out the navigation data table contained in the memory M1 and records the navigation data on the recording medium, thereby completing the recording control routine (S21).

Meanwhile, the recording control routine is not entered at step S13, the control unit 50 tests if editing of data recorded on the recording medium is requested (S23). If so, the control unit 50 reads the UD_PGC_SRP_Ns stored in the UD_PGCITI of the navigation data table to look for the number of UD_PGCIs created so far (P). Also, the control unit 50 searches each UD_PGCI for the UD_PGCGI which includes the number of CIs contained in the corresponding UD_PGCI, and adds up the number of CIs of every UP_PGCGI to obtain the total number of CIs contained in the UD_PGCIT (Q), which will be stored in an internal register (S25).

The control unit 50 tests whether the number of UD_PGCIs (P) is less than a preset limit (i; for example, 99) and the total number of CIs (Q) is less than another preset limit (j; for example, 25,000) (S27). Unless the condition is satisfied, the requested editing operation cannot be accomplished. The control unit 50, therefore, returns program control to step S21, which finishes the recording control routine by copying the navigation data table in the memory M1 to the recording medium. If the condition is satisfied at step S27, the control unit 50 begins execution of the editing control routine (S29) and awaits the user's input (S31).

In response to the user's request received from step S31 for creating reproduction order information, the control unit 50 creates a new UD_PGCI and CI, adding the UD_PGCI to the UD_PGCIT in the memory M1 (S33), And the control unit 50 creates a user-defined PGC search pointer (UD_PGC_SRP) and makes it point to the created UD_PGCI, before incrementing the UD_PGC_SPR_Ns (P) stored in the UD_PGCITI by one (S35). Next, the control unit 50 sets the number of CIs in the UD_PGCI with 1 and increments the number of CIs (Q) stored in the internal register by one, respectively (S37).

Continuing at step S39, the control unit 50 tests whether creation of additional reproduction order information has been received (S39) and if so, checks whether the total number of CIs (Q) stored in the internal register is less than the preset limit (j; 25,000) (S41). Unless the condition is satisfied, the control unit 50 returns program control to S21, thereby completing the recording control routine. If the condition is satisfied at step S41, the control unit 50 creates a CI according to the request and adds it to the UD_PGCI (S41). Next, the control unit 50 increments the number of CIs stored in the UD_PGCI and the total number of CIs (Q) stored in the internal register by one, respectively (S45).

Continuing at step S47, the control unit 50 checks if request for finishing editing of the current UD_PGC has been received (S47). If so, step S49 is reached, where it is tested whether request for finishing the editing mode has been received. If not, the control unit 50 returns program control to step S39 to repeat the above procedure. Unless request for finishing the editing mode has been received at step S49, the program control is continued to S25, where creation of a new user-defined PGC starts. If request for finishing editing mode has been received at step S49, step S21 is reached, where the navigation data stored in the memory M1 is copied to the recording medium and the recording control routine is completed.

The invention may be embodied in other specific forms without departing from the sprit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of providing a presentation order information group having at least one presentation order information unit for a recording medium, the method comprising the steps of:
   (a) creating a presentation order information unit for a presentation order information group based on a recording or editing operation;
   (b) obtaining a total number of presentation order information units for all presentation order information groups; and
   (c) providing said presentation order information group having the created presentation order information unit when the total number of presentation order information units is less than a predetermined value.

2. The method of claim 1, wherein said data is video object data including one of moving picture data and still picture data.

3. The method of claim 1, wherein said presentation order is defined by a user.

4. The method of claim 1, wherein said presentation order is defined by a recording order.

5. The method of claim 1, wherein said presentation order information units are Cell Informations (CIs).

6. The method of claim 1, wherein said presentation order information groups are Program Chain Informations (PGCIs).

7. A recording medium accessible by a recording/reproducing device, the recording medium comprising:
   (a) at least one data area in which a data is recorded; and
   (b) at least one navigation information area in which a navigation information is recorded,
   wherein the navigation information includes a plurality of presentation order information units for defining a data presentation sequence and a plurality of presentation order information groups each of which including at least one of the presentation order information units, and
   wherein a recording or editing operation on the recording medium is permitted only when the total number of the presentation order information units for all the presentation order information groups is less than a predetermined value.

8. The recording medium of claim 7, wherein said data is a video object including at least one of moving picture data or still picture data.

9. The recording medium of claim 7, wherein said presentation sequence is defined by a user.

10. The recording medium of claim 7, wherein said presentation order information units are Cell Informations (CIs).

11. The recording medium of claim 7, wherein said presentation order information groups are Program Chain Informations (PGCIs).

12. A system for providing a presentation order information group having at least one presentation order information unit for a recording medium, the system comprising:
   (a) a pickup for recording/reproducing information on/from a recording medium; and
   (b) a controller to control a recording or editing operation and to obtain a total number of presentation order information units for all presentation order information groups, wherein the recording or editing operation is permitted when the total number of said presentation order information units in all said presentation order information groups is less than a predetermined value.

13. The system of claim 12, wherein said data is video object data including one of moving picture data and still picture data.

14. The system of claim 12, wherein said presentation order is defined by a user.

15. The system of claim 12, wherein said presentation order is defined by a recording order.

16. The system of claim 12, wherein said presentation order information units are Cell Informations (CIs).

17. The system of claim 12, wherein said presentation order information groups are Program Chain Informations (PGCIs).

* * * * *